United States Patent
Avery

(10) Patent No.: US 11,761,484 B2
(45) Date of Patent: Sep. 19, 2023

(54) FLARED SPRINGS FOR BEARING ASSEMBLIES

(71) Applicant: Hamilton Sundstrand Corporation, Charlotte, NC (US)

(72) Inventor: David J. Avery, Hampden, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/542,798

(22) Filed: Dec. 6, 2021

(65) Prior Publication Data

US 2023/0175550 A1 Jun. 8, 2023

(51) Int. Cl.
- *F16C 27/02* (2006.01)
- *F16C 19/06* (2006.01)
- *F16C 25/08* (2006.01)
- *F04C 2/08* (2006.01)

(52) U.S. Cl.
CPC ............... *F16C 27/02* (2013.01); *F04C 2/08* (2013.01); *F16C 19/06* (2013.01); *F16C 25/083* (2013.01); *F04C 2240/56* (2013.01); *F16C 2360/43* (2013.01)

(58) Field of Classification Search
CPC .......... F16C 19/06; F16C 25/02; F16C 25/04; F16C 27/02; F16C 2360/43; F04C 2/08; F04C 2240/56; F16F 1/08
See application file for complete search history.

(56) References Cited

U.S. PATENT DOCUMENTS

| | | | |
|---|---|---|---|
| 3,589,226 A | | 6/1971 | Shadowens, Jr. |
| 3,947,078 A | * | 3/1976 | Olsaker ................. F01C 21/003 384/620 |
| 5,010,783 A | | 4/1991 | Sparks et al. |
| 5,897,303 A | | 4/1999 | Mueller |
| 8,205,858 B2 | * | 6/2012 | Mueller ............. G05D 16/2022 303/119.2 |
| 9,435,454 B2 | | 9/2016 | Blume |
| 10,746,148 B2 | | 8/2020 | Zankl et al. |
| 2018/0051743 A1 | | 2/2018 | Yates |
| 2018/0100504 A1 | * | 4/2018 | Yates ...................... F04C 2/107 |
| 2020/0392997 A1 | * | 12/2020 | Le Duc ................... F16C 33/74 |
| 2021/0355939 A1 | * | 11/2021 | Tanida .................... F04C 29/02 |

FOREIGN PATENT DOCUMENTS

GB 1147062 A * 4/1968
JP 2019183937 A 10/2019

OTHER PUBLICATIONS

Extended European Search Report dated Mar. 24, 2023, issued during the prosecution of European Patent Application No. EP 22211247.6.

* cited by examiner

*Primary Examiner* — Phillip A Johnson
(74) *Attorney, Agent, or Firm* — Locke Lord LLP; Joshua L. Jones; Scott D. Wofsy

(57) ABSTRACT

A bearing assembly includes a bearing defining a bearing bore therethrough with a plurality of spring bores circumferentially distributed around the bearing bore. A respective spring is seated in each of the spring bores. Each spring is has a flared end that is larger in diameter than a main section of the spring. The flared end of each spring engages its respective spring bore.

11 Claims, 2 Drawing Sheets

FLARED SPRINGS FOR BEARING ASSEMBLIES

BACKGROUND

1. Field

The present disclosure relates to bearings, and more particularly to bearings for gear pumps such as used in fuel control systems for engines, e.g. in aerospace applications.

2. Description of Related Art

Gear pumps use two sets of bearings, one on each end of a driven gear shaft, and one on each end of a driving gear shaft. Typically at least some of the bearings are assembled into a bore the housing as a blind assembly. There are a plurality of springs distributed around the bearing, each spring seated in a spring bore. All of the springs must be maintained in their respective spring bore during assembly. One technique for helping keep the springs in their spring bores it to load the spring bores with lubrication, however the assembly process is still lengthy and painstaking due to the care that must be exercised to avoid having any of the springs fall out of its spring bore during the blind assembly. During repairs or other maintenance, if jet fuel has been run through the pump, the lubricant can be washed away, so it does not hold the springs. Any springs that fall out during assembly must be accounted for so they do not give rise to FOD (foreign object damage). This adds to the time and painstaking assembling and disassembling the gear pumps, especially due to the large number of springs that can be involved.

The conventional techniques have been considered satisfactory for their intended purpose. However, there is an ever present need for improved systems and methods for blind assembly of bearings and the like. This disclosure provides a solution for this need.

SUMMARY

A bearing assembly includes a bearing defining a bearing bore therethrough with a plurality of spring bores circumferentially distributed around the bearing bore. A respective spring is seated in each of the spring bores. Each spring is has a flared end that is larger in diameter than a main section of the spring. The flared end of each spring engages its respective spring bore.

The flared end of each spring can engage its respective bore with an interference fit. The interference fit can be from 3-5 thousandths of an inch (76.2-127 microns) by which the flared end is larger in diameter than its respective spring bore for each spring. The spring bores can be defined in an annular ledge that is recessed into the bearing relative to surface of the bearing that defines an end of the spring bore. The spring bores and the bearing bore can all be parallel to a central axis of the bearing. Both ends of each spring can be flared, having larger diameters than the main section of the spring.

The assembly can include a gear shaft assembled into the first bearing and a second bearing assembled to the gear shaft opposite the first bearing. A pump gear can be defined on the gear shaft between the first and second bearings. The second bearing can define a bearing bore therethrough, into which the gear shaft is assembled, with a plurality of spring bores circumferentially distributed around the bearing bore. The second bearing can include a respective spring seated in each of the spring bores of the second bearing, wherein each spring of the second bearing is has a flared end that is larger in diameter than a main section of the spring, wherein the flared end of each spring engages its respective spring bore.

The assembly can include a housing with a blind bore therein. At least one of the first bearing and the second bearing can be assembled into the blind bore. The springs of the first and second bearings can be compressed against the housing. The assembly can include a third bearing assembled into the housing and a fourth bearing assembled into the housing opposite the third bearing. A second gear shaft can be seated in a respective bearing bore of each of the third bearing and the fourth bearing. A pump gear can be defined on the gear shaft between the third and fourth bearings. The pump gear of the first gear shaft can engage the pump gear of the second gear shaft for pumping fluid through a main fluid passage of the housing.

Each of the third and fourth bearings can include a plurality of spring bores defined therein circumferentially around the respective bearing bore, wherein a respective spring with a flared end is seated in each. The first bearing and second bearing can be servo bearings having a combined 38 springs in their respective spring bores, and the third bearing and fourth bearing can be main bearings having a combined 44 springs in their respective spring bores.

A method of assembling a bearing assembly includes inserting a bearing into a bore in a housing as a blind assembly, wherein a plurality of springs are seated assembled to the bearing with respective interference fits to prevent the springs disengaging from the bearing during the blind assembly. The method can include seating of the springs into a respective spring bore of the bearing with an interference fit prior to inserting the bearing into the bore in the housing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
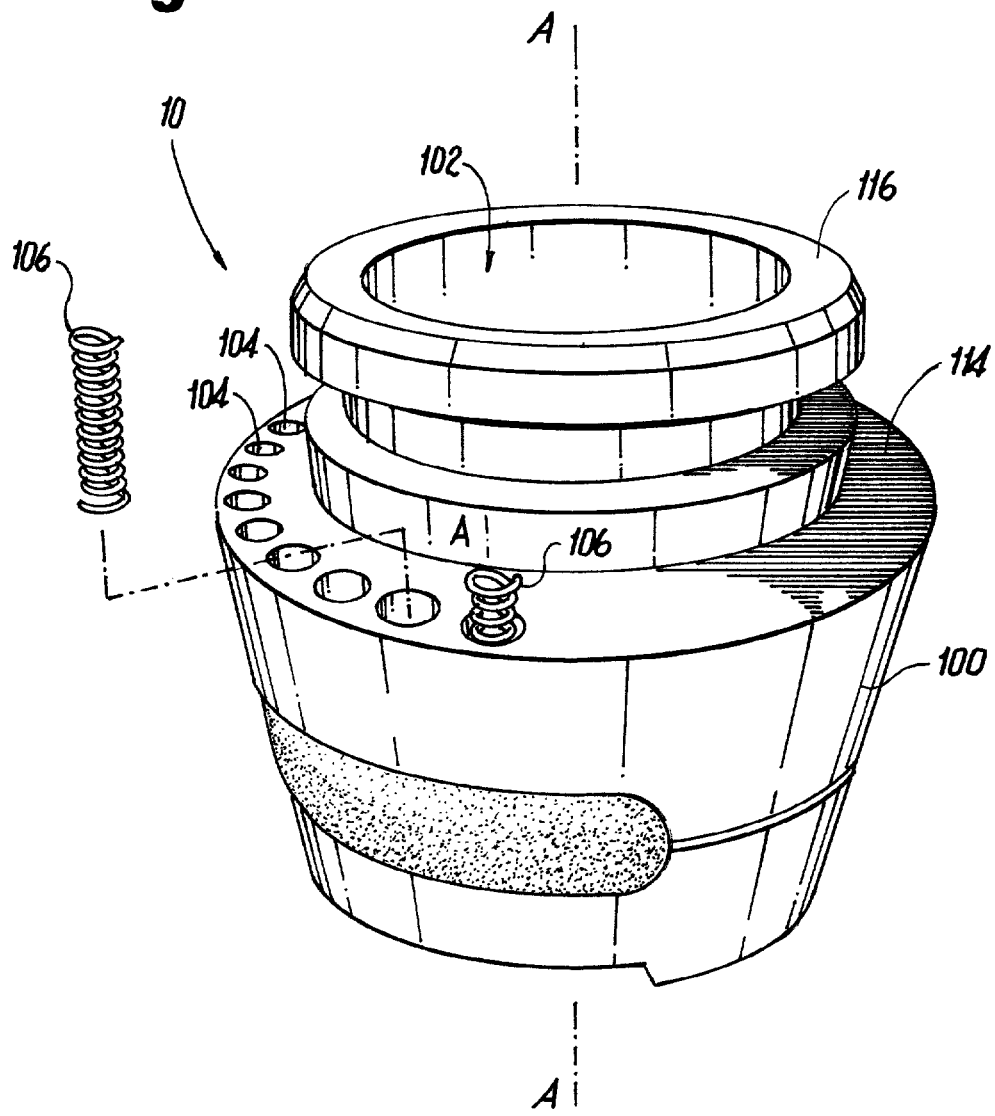
FIG. 1 is a perspective view of an embodiment of a bearing constructed in accordance with the present disclosure, showing one of the springs assembled into one of the spring bores.

Reference will now be made to the drawings wherein like reference numerals identify similar structural features or aspects of the subject disclosure. For purposes of explanation and illustration, and not limitation, a partial view of an embodiment of a bearing in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to facilitate assembly and disassembly of bearings such as in gear pumps.

Figure 2:
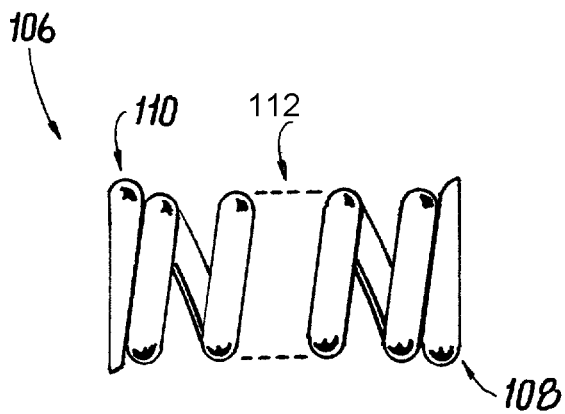
FIG. 2 is a schematic side elevation view of the spring of FIG. 1, showing the flared ends of the spring.

A bearing assembly 10 includes a bearing 100 defining a bearing bore 102 therethrough with a plurality of spring bores 104 circumferentially distributed around the bearing bore 102. A respective spring 106 is seated in each of the spring bores. As shown in FIG. 2, each spring 106 is has flared ends 108, 110 that are larger in diameter than a main section 112 of the spring. The flared end 108 of each spring 106 engages its respective spring bore 104, as shown in FIG. 1. Each spring 106 and its respective spring bore 104 are engaged to each other with an interference fit, e.g. from 3-5 thousandths of an inch (76.2-127 microns) by which the flared end 108 is larger in diameter than its respective spring bore 104 even at the extremes of the manufacturing tolerance for the springs 106 and spring bores 104. The spring 106 can optionally have a regular, non-flared end 110 for the end that is not in the spring bore 104. However, there are potential advantages to having both ends 108, 110 flared such as for assembly mistake proofing or possible mechanical or physical assembly ease. The spring bores 104 are defined in an annular ledge 114 that is recessed in the axial direction (along axis A) into the bearing 100 relative to an end surface 116 of the bearing 100 that defines an end of the spring bore 102. The spring bores 104 and the bearing bore 102 are all parallel to a central axis A of the bearing 100, e.g. the bore axis B of each spring bore 104 is parallel to axis A.

Figure 3:
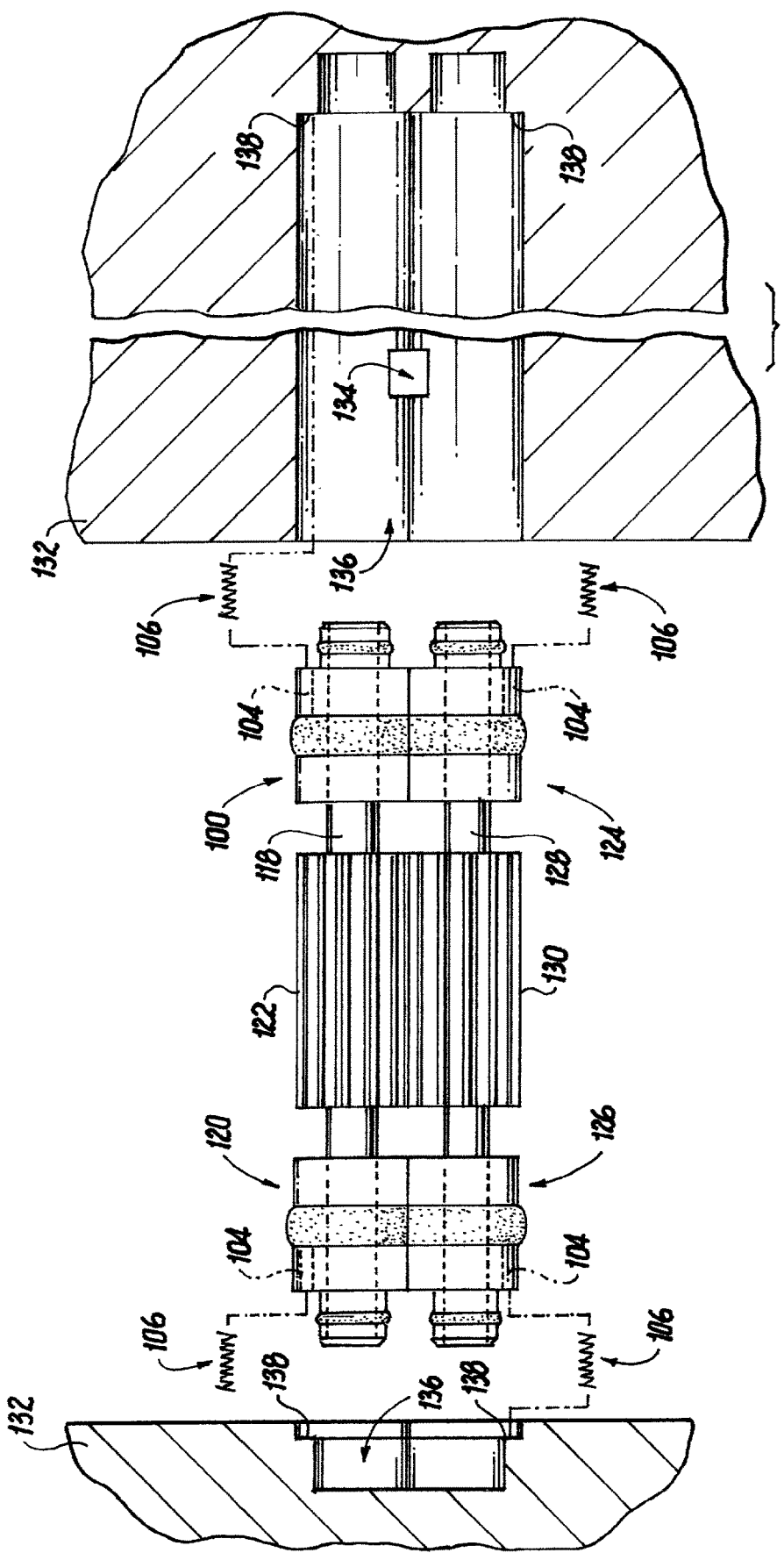
FIG. 3 is an exploded schematic view of a bearing assembly using four bearings like the one shown in FIG. 1, showing the bearing assembly with other gear pump components for assembly into the pump housing.

With reference now to FIG. 3, the assembly 10 includes a gear shaft 118 assembled into the bearing bore 102 (labeled in FIG. 1) of the bearing 100, and a second bearing 120 assembled to the gear shaft 118 opposite the first bearing 100. A pump gear 122 is defined on the gear shaft 118 between the first and second bearings 100, 120. The second bearing 120 defines a bearing bore 102 (as labeled in FIG. 1) therethrough, into which the gear shaft 118 is assembled, with a plurality of spring bores 104 circumferentially distributed around the bearing bore 102, which are not labeled in FIG. 3 for sake of clarity in the drawing, but see FIG. 1. The second bearing 120 includes a respective spring 106 seated in each of the spring bores 104 of the second bearing 120, which is configured the same as springs 106 of the first bearing 100, including the flared ends 108, 110 shown in FIG. 2, and the interference fit.

The assembly 10 includes a third bearing 124 and a fourth bearing 126 assembled opposite each other. A second gear shaft 128 is seated in a respective bearing bore 102 (not labeled in FIG. 3, but see FIG. 1) of each of the third and fourth bearings 124,126. A pump gear 130 is defined on the gear shaft 128 between the third and fourth bearings 124, 126. The pump gear 122 of the first gear shaft 118 engages the pump gear 130 of the second gear shaft 128 for pumping fluid through a main fluid passage 134 of the housing 132.

Each of the third and fourth bearings 124, 126 includes a plurality of spring bores 104 defined therein circumferentially around the respective bearing bore 102 (labeled in FIG. 1), wherein a respective spring 106 with a flared end 108 is seated in each of the spring bores 104. The first bearing 100 and second bearing 120 are servo bearings having a combined 38 springs 106 in their respective spring bores 104 (only some of which are shown and labeled in FIG. 3 for sake of clarity). The third bearing 124 and fourth bearing 126 are main bearings having a combined 44 springs in their respective spring bores 104 (only some of which are shown in FIG. 3 for sake of clarity). Those skilled in the art will readily appreciate that any suitable number of springs and spring bores can be used as applicable to specific applications.

The assembly 10 includes the housing 132, the two sections of which are joined together with the bearings 100, 120, 124, 126, springs, 106, and gear shafts 118, 128 inside when assembled together. The bores 136 within the housing 132 are blind bores into which bearings 100, 120, 124, 126 and their springs 106 are assembled as a blind assembly. The springs 106 of the bearings 100, 120,124, 126 are compressed against respective surfaces 138 in the housing 123. Those skilled in the art will readily appreciate that FIG. 3 is simplified, omitting driving components and the like, for sake of clarity herein.

While inserting a bearing 100, 120, 124, 126 into a bore 136 in the housing 132 as a blind assembly, the plurality of springs 104 are seated assembled to the bearing 100, 120, 124, 126 with respective interference fits to prevent the springs disengaging from the bearing during the blind assembly. The springs 106 can be inserted into a respective spring bore 104 of the bearing 100, 120, 124, 126 with an interference fit prior to inserting the bearing into the bore 100, 120, 124, 126 in the housing. For example, a supplier can provide the bearings 100, 120, 124, 126 with the springs 106 already assembled therein to a manufacturer who then assembles the assembly 10.

Potential advantages include the following. Cost can be reduced due to reduced assembly time, as the interference fits maintain the springs 106 in place. Springs 106 can be preassembled and captured ready for immediate use in a pump. The retention of the springs 106 in their bores 104 reduces risk of foreign object damage (FOD) from escaped springs. No lubricant or other chemicals are needed to hold the springs in place.

The methods and systems of the present disclosure, as described above and shown in the drawings, provide for facilitating assembly and disassembly of bearings such as in gear pumps, as well as reduction of foreign object damage (FOD) in such pumps. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A bearing assembly comprising:
   a bearing defining a bearing bore therethrough with a plurality of spring bores circumferentially distributed around the bearing bore; and
   a respective spring seated in each of the spring bores, wherein each spring is has a flared end that is larger in diameter than a main section of the spring, wherein the flared end of each spring engages its respective spring bore, wherein the bearing is a first bearing and further comprising:
   a gear shaft assembled into the first bearing; and
   a second bearing assembled to the gear shaft opposite the first bearing, wherein a pump gear is defined on the gear shaft between the first and second bearings, wherein the second bearing defines a bearing bore therethrough, into which the gear shaft is assembled, with a plurality of spring bores circumferentially distributed around the bearing bore, and further comprising:

a respective spring seated in each of the spring bores of the second bearing, wherein each spring of the second bearing is has a flared end that is larger in diameter than a main section of the spring, wherein the flared end of each spring engages its respective spring bore.

2. The bearing assembly as recited in claim 1, wherein the flared end of each spring engages its respective bore with an interference fit.

3. The bearing assembly as recited in claim 2, wherein the interference fit is from 3-5 thousandths of an inch (76.2-127 microns) by which the flared end is larger in diameter than the respective spring bore for each spring.

4. The bearing assembly as recited in claim 1, wherein the spring bores are defined in a respective annular ledge of the respective first or second bearing that is recessed into the respective first or second bearing relative to a respective surface of the respective first or second bearing that defines an end of the bearing bore of the respective first or second bearing.

5. The bearing assembly as recited in claim 1, wherein the spring bores and the bearing bore are all parallel to a central axis of the bearing.

6. The bearing assembly as recited in claim 1, wherein both ends of each spring are flared, having larger diameters than the main section of the spring.

7. The bearing assembly as recited in claim 1, further comprising:

a housing with a blind bore therein, wherein at least one of the first bearing and the second bearing are assembled into the blind bore, and wherein the springs of the first and second bearings are compressed against the housing.

8. The bearing assembly as recited in claim 1, wherein the gear shaft is a first gear shaft and further comprising:

a third bearing assembled into the housing;

a fourth bearing assembled into the housing opposite the third bearing; and a second gear shaft seated in a respective bearing bore of each of the third bearing and the fourth bearing, wherein a pump gear is defined on the gear shaft between the third and fourth bearings, wherein the pump gear of the first gear shaft engages the pump gear of the second gear shaft for pumping fluid through a main fluid passage of the housing.

9. The bearing assembly as recited in claim 8, wherein each of the third and fourth bearings includes a plurality of spring bores defined therein circumferentially around the respective bearing bore, wherein a respective spring with a flared end is seated in each.

10. The bearing assembly as recited in claim 9, wherein the first bearing and second bearing are servo bearings having a combined 38 springs in the respective spring bores, and wherein the third bearing and fourth bearing are main bearings having a combined 44 springs in the respective spring bores.

11. The bearing assembly as recited in claim 10, wherein both ends of each spring are flared.

\* \* \* \* \*